(12) United States Patent
Kroell et al.

(10) Patent No.: US 9,702,513 B2
(45) Date of Patent: Jul. 11, 2017

(54) LIGHTING DEVICE WITH A PUMP LASER MATRIX, AND METHOD FOR OPERATING SAID LIGHTING DEVICE

(71) Applicant: OSRAM GMBH, Munich (DE)

(72) Inventors: Josef Kroell, Potsdam (DE); Ulrich Hartwig, Berlin (DE); Kai Franz, Regensburg (DE); Klaus Finsterbusch, Berlin (DE)

(73) Assignee: OSRAM GmbH, Munich (DE)

( * ) Notice: Subject to any disclaimer, the term of this patent is extended or adjusted under 35 U.S.C. 154(b) by 107 days.

(21) Appl. No.: 14/377,464

(22) PCT Filed: Jan. 15, 2013

(86) PCT No.: PCT/EP2013/050681
§ 371 (c)(1),
(2) Date: Aug. 7, 2014

(87) PCT Pub. No.: WO2013/117390
PCT Pub. Date: Aug. 15, 2013

(65) Prior Publication Data
US 2016/0010812 A1      Jan. 14, 2016

(30) Foreign Application Priority Data
Feb. 7, 2012 (DE) .......... 10 2012 201 790

(51) Int. Cl.
*F21K 99/00* (2016.01)
*G03B 21/00* (2006.01)
(Continued)

(52) U.S. Cl.
CPC ............ *F21K 9/56* (2013.01); *F21K 9/64* (2016.08); *G03B 21/008* (2013.01);
(Continued)

(58) Field of Classification Search
CPC  G03B 21/14; G03B 21/2053; G03B 21/2033; G03B 21/2013; G03B 21/204;
(Continued)

(56) References Cited

U.S. PATENT DOCUMENTS

| | | | |
|---|---|---|---|
| 6,357,889 | B1 | 3/2002 | Duggal et al. |
| 2006/0072314 | A1 | 4/2006 | Rains |

(Continued)

FOREIGN PATENT DOCUMENTS

| | | | | |
|---|---|---|---|---|
| DE | WO 2012025147 A1 | * | 3/2012 | ........... A61B 1/0653 |
| DE | WO 2012116733 A1 | * | 9/2012 | ........... G03B 21/204 |
| WO | WO 2009/112961 | | 9/2009 | |

*Primary Examiner* — Christina Riddle
*Assistant Examiner* — Christopher Lamb, II
(74) *Attorney, Agent, or Firm* — Cozen O'Connor

(57) ABSTRACT

A lighting device comprising a pump laser matrix (2) and a phosphor arrangement. The pump laser matrix (2) is configured to emit pump radiation (7) having a controllable pump radiation power distribution for the irradiation of the phosphor arrangement (4). The phosphor arrangement (4) comprises at least two different phosphors (R, Y, G) which can be irradiated with the pump radiation (7) and re-emit said pump radiation in a manner such that it is at least partly and in each case differently wavelength-converted. The lighting device (1) is configured to generate, with the aid of the pump laser matrix (2), a controllable distribution of the surface power density of the pump radiation on the phosphors (R, Y, G) of the phosphor arrangement (4).

18 Claims, 5 Drawing Sheets

(51) Int. Cl.
*G03B 21/20* (2006.01)
*H05B 33/08* (2006.01)
*F21K 9/64* (2016.01)

(52) U.S. Cl.
CPC ......... *G03B 21/204* (2013.01); *H05B 33/086* (2013.01); *H05B 33/0857* (2013.01); *Y02B 20/341* (2013.01)

(58) Field of Classification Search
CPC ......... G03B 21/2066; F21K 9/64; F21K 9/60; F21V 9/16; G02F 2001/133614; H01L 33/50
USPC .......................................................... 353/85
See application file for complete search history.

(56) References Cited

U.S. PATENT DOCUMENTS

| | | | |
|---|---|---|---|
| 2009/0284148 A1 | 11/2009 | Iwanaga | |
| 2012/0026469 A1* | 2/2012 | Akiyama | G02B 27/142 353/20 |
| 2012/0099084 A1* | 4/2012 | Toyooka | G03B 21/14 353/85 |
| 2012/0133903 A1* | 5/2012 | Tanaka | G03B 21/2013 353/31 |
| 2013/0135593 A1* | 5/2013 | Saitou | G03B 21/204 353/31 |
| 2013/0155649 A1* | 6/2013 | Bruemmer | G03B 21/14 362/84 |
| 2013/0329448 A1* | 12/2013 | Franz | G03B 21/204 362/555 |
| 2014/0153214 A1* | 6/2014 | Bruemmer | A61B 1/0653 362/84 |

\* cited by examiner

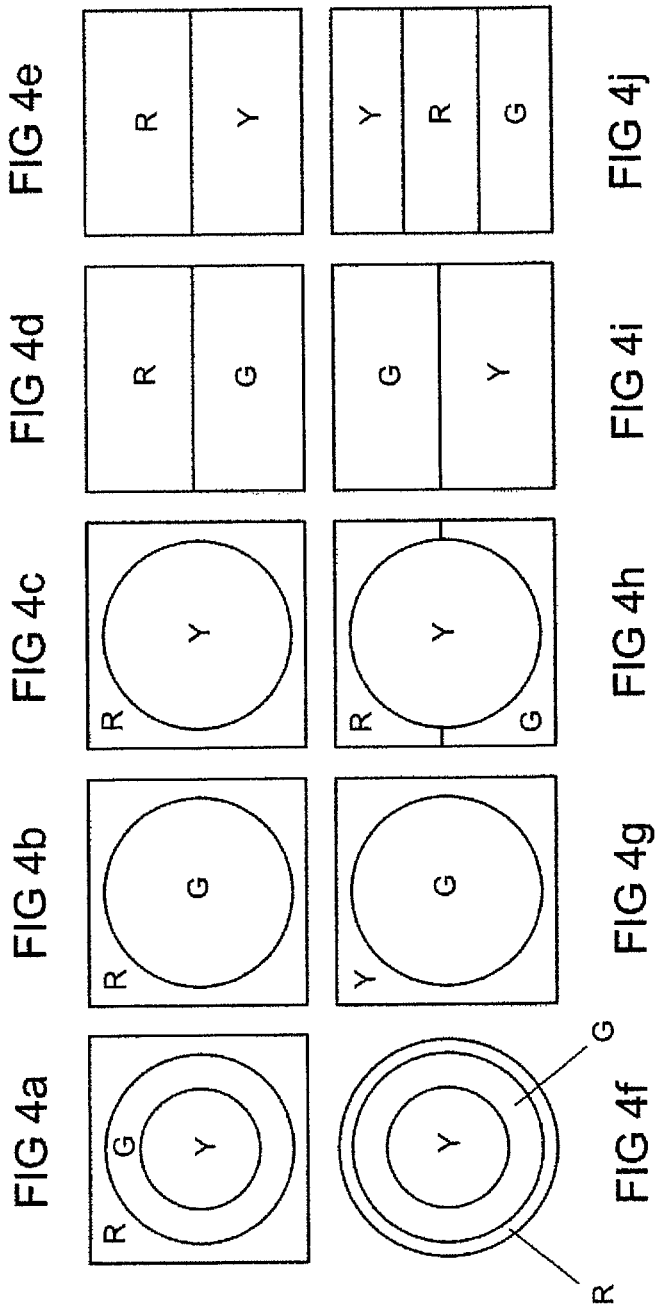

LIGHTING DEVICE WITH A PUMP LASER MATRIX, AND METHOD FOR OPERATING SAID LIGHTING DEVICE

RELATED APPLICATIONS

This is a U.S. National stage of International application No. PCT/EP2013/050681 filed on Jan. 15, 2013.

This patent application claims the priority of German application no. 10 2012 201 790.9 filed Feb. 7, 2012, the disclosure content of which is hereby incorporated by reference.

FIELD OF THE INVENTION

The invention relates to a lighting device comprising a pump laser matrix and a phosphor arrangement, which is irradiated by the pump laser matrix. Furthermore, the invention relates to a method for operating said lighting device.

The invention is applicable in particular to projection devices, in particular for film and video projection, in technical and medical endoscopy, for lighting effects in the entertainment industry, for medical irradiations and in the automotive sector, in particular as a headlight for motor vehicles.

BACKGROUND OF THE INVENTION

Light sources having a high luminance are employed in a wide variety of fields, for instance in endoscopy and likewise in projection apparatuses, wherein gas discharge lamps are currently the most widely used. In lighting applications, for example projection or endoscopy, on the basis of LARP ("Laser Activated Remote Phosphor") technology, which is known in principle, a phosphor is irradiated by a laser. The laser radiation that impinges on the phosphor, also designated hereinafter as pump radiation, is partly converted into wavelength-converted useful light by means of wavelength conversion by the phosphor and is partly backscattered without wavelength conversion by the phosphor.

Although laser radiation is currently usually used in LARP technology, in the context of the present invention, the term LARP is intended to be generalized to the effect that other pump radiation sources suitable for phosphor excitation with radiation properties comparable to a laser, in particular the small beam divergence thereof, are also encompassed, for example super luminescence diodes, if appropriate with or without a downstream optical system.

SUMMARY OF THE INVENTION

One object of the present invention is to provide a lighting device on the basis of LARP technology with color control.

This object is achieved in accordance with one aspect of the present invention directed to a lighting device comprising a pump laser matrix and a phosphor arrangement, wherein the pump laser matrix is designed to emit pump radiation having a controllable pump radiation power distribution for the irradiation of the phosphor arrangement, the phosphor arrangement comprises at least two different phosphors which can be irradiated with the pump radiation and re-emit said pump radiation in a manner such that it is at least partly and in each case differently wavelength-converted, and the lighting device is designed to generate, with the aid of the pump laser matrix, a controllable distribution of the surface power density of the pump radiation on the phosphors of the phosphor arrangement.

Another aspect of the present invention is directed to a method for operating a lighting device comprising a controllable pump laser matrix and a phosphor arrangement comprising at least two different phosphors. The phosphors are suitable for re-emitting the pump radiation of the pump laser matrix in a manner such that it is at least partly and in each case differently wavelength-converted. The method comprises the following method steps: controlling the radiation power of the individual pump lasers or pump laser groups of the pump laser matrix for controlling the distribution of the surface power density of the pump radiation on the phosphors; and irradiating the at least two different phosphors of the phosphor arrangement with pump radiation from the pump laser matrix.

Hereinafter, features that relate more to the aspects of the invention appertaining to the device subject matter are also explained jointly together with features that characterize rather the technical aspects appertaining to the method, in order to facilitate an understanding of the technical relationships of the invention.

An embodiment of the invention involves controlling, by controlling the pump radiation power of individual pump lasers of a pump laser matrix, the distribution of the surface power density of the pump radiation on the phosphors of a phosphor arrangement, which are arranged separately in the irradiation surface, and thus ultimately in controlling the color locus of the mixed light that arises as a result of the mixing of the pump radiation that is in each case differently wavelength-converted by the phosphors (=colored light portions of the mixed light).

To put it in a simplified way, the color control of the lighting device is therefore effected by a phosphor pattern composed of different phosphors being irradiated with a pump radiation pattern that is controllable with regard to its shape and surface power density distribution. A pump radiation pattern is generated by the targeted driving of the individual lasers of the laser matrix, in other words by a corresponding drive pattern of the laser matrix. The controllable pump radiation pattern controls the colored light portions which the different phosphors contribute to the additive mixed light, and thus ultimately the color locus of the mixed light. The spectral distributions of the individual pump lasers can moreover be identical or different.

According to an embodiment of the invention, provision can be made for the respective pump radiation power of a pump laser of the pump laser matrix to be controllable from 0 to 100%, wherein the value 0% corresponds to the pump radiation source being switched off and the value 100% corresponds to the respective full nominal power. Depending on the application, smaller control ranges or even just switching a pump laser on or off may also suffice. Particularly in the case of a pump laser matrix comprising a relatively large number of pump lasers, the two states on/off of individual pump lasers, under certain circumstances, may enable a sufficiently fine control of the pump radiation pattern on the different phosphors. In this case, provision can be made, as necessary, for individual pump lasers to be driven separately or to be combined to form pump laser groups that are driven jointly. The pump lasers can be operated in continuous wave operation (cw operation), in pulsed operation or in a combination of these two operating modes. In this case, different lasers of the pump laser matrix can be operated using different operating methods. The respective pump radiation power can be modulated, for example by a pulse width modulation method.

By suitably controlling a pump laser matrix, it is possible to control the distribution of the pump radiation power density on the phosphors and thus the contribution by the individual phosphors to the mixed light and, consequently, ultimately also the color locus of the mixed light. In this case, the control of the color locus can consist either in a targeted change of the color locus during operation or in a constant regulation, or else in a combination of both. In some applications, it may also suffice for the respectively desired color locus to be set before the lighting device is started up.

In order to enable the different phosphors to be selectively irradiated, the phosphors of the phosphor arrangement are arranged separately from one another, for example in the irradiation plane alongside one another in a segmentlike fashion in a phosphor layer. The phosphors therefore form a type of phosphor pattern, the phosphor constituents of which are irradiated with a controllable pump radiation pattern.

The individual pump lasers are preferably embodied as laser diodes. Laser diodes, as usual in the case of optical semiconductors, can be switched or driven particularly simply and rapidly. The laser radiation of the individual laser diodes together forms a laser radiation pattern on the phosphors. By simple switching—lasers on/off—or other control of the output power of individual laser diodes, it is possible to vary the laser radiation pattern on the phosphors.

However, the pump laser matrix need not necessarily consist of real individual pump lasers. Rather, the pump laser matrix can alternatively also be realized with the aid of a spatial light modulator (SLM), for example a controllable multi-mirror system such as a digital micromirror device (DMD), which is irradiated by means of at least one laser. The digital micromirror device (manufacturer: Texas Instruments) known from video projection modulates the pump laser radiation impinging on the micromirrors by rapid tilting of the mirrors. The pump radiation of a pump laser operated with a constant power can thus be spatially and temporally modulated, without the operating power of the pump laser having to be adapted or modulated. This has the advantage that the pump laser remains in thermal equilibrium and can thus be kept in a stable mode of operation.

Preferably, for mixing the pump radiation that is in each case differently wavelength-converted by the phosphors, the colored light portions generated by phosphor conversion, provision is made of an optical light mixer, for example an optical system based on total internal reflection (TIR). In this case, the optical light mixer is arranged between the pump laser matrix and the phosphor pattern, preferably very near above the phosphor pattern, if the phosphor pattern is designed for use in reflection. In this case, that portion of the pump radiation which is backscattered or diffusely reflected and wavelength-converted by the phosphor pattern is used for generating the additive mixed light. The incidence of the pump radiation and the collecting of the colored light portions generated by wavelength conversion are therefore effected on the same side of the phosphor pattern. The spatial proximity of the optical light mixer ensures that the colored light portions that are wavelength-converted and scattered typically in a Lambertian distribution are efficiently collected by said light mixer and are intermixed on their path through the light mixer. By contrast, the pump laser radiation propagating through the optical light mixer in the opposite direction, in comparison with the scattered radiation coming from the phosphor pattern, is directional and collimated and thus, even after passing through the optical light mixer, still generates a sufficiently differentiated laser radiation pattern on the phosphor pattern. The initially explained control of the excitation of the phosphor pattern by means of the laser beam matrix is therefore ensured.

Moreover, the rear side of the phosphor pattern can be cooled without any problems in this so-called reflection mode, for example by the phosphor pattern being arranged on a heat sink. Alternatively, the phosphor pattern can be designed for use in transmission. In that case, the optical light mixer is arranged on its rear side, on the opposite side of the phosphor pattern relative to the incident pump radiation. In this case, therefore, the radiation portions which pass through the phosphors and are at least partly wavelength-converted by the latter are collected and mixed by the optical light mixer.

In this case, the phosphor pattern—apart from convection and heat emission—can be cooled only by means of a circumferential enclosure or, for example, an air flow. By contrast, a cooling arrangement such as in the reflection mode is not possible.

The pump radiation is preferably in the ultraviolet (UV) or blue (B) spectral range. By means of suitable phosphors known per se, it is thus possible to produce converted light having typically longer wavelengths (down conversion), in particular as necessary also green (G) and red (R) light, for example in order—together with blue light—to generate white mixed light.

Another aspect of the invention is directed to a method for operating the lighting device according to embodiments of the invention, comprising a pump laser matrix and a phosphor arrangement comprising at least two different phosphors, wherein the phosphors are suitable for re-emitting the pump radiation of the pump laser matrix in a manner such that it is at least partly and in each case differently wavelength-converted, wherein the method comprises the following method steps:

controlling the radiation power of the individual pump lasers or pump laser groups of the pump laser matrix for controlling the distribution of the surface power density of the pump radiation on the phosphors, irradiating the at least two different phosphors of the phosphor arrangement with the controlled pump radiation from the pump laser matrix.

For the operating method according to embodiments of the invention, therefore, the lighting device is to be designed such that the laser radiation of the laser matrix generates a laser radiation pattern on the separately arranged phosphors of the phosphor arrangement. The outer shape and the surface power distribution of the laser radiation pattern are controlled by the control of the individual lasers of the laser matrix. The proportion of the useful light that is constituted by the laser radiation that is wavelength-converted into corresponding colored light components by the different phosphors, and ultimately the color locus of the mixed light resulting from the wavelength conversion are controlled as a result.

For the further use, it is generally advantageous for the radiation that is in each case differently wavelength-converted by the phosphors, in a supplementary method step, to be collected and mixed by means of a suitable optical light mixer, for example an optical system based on total internal reflection (TIR).

If a change in the color locus of the mixed light is desired, the drive pattern of the laser matrix is changed in order thereby to obtain a change in the laser radiation pattern on the phosphors and ultimately a change in the colored light portions of the mixed light.

Laser diodes are generally damaged even if their specified maximum power is exceeded only briefly. In order to be able to compensate for phosphor degradation and similar lifetime effects, it may therefore be advantageous to operate the individual lasers firstly below the permissible maximum power. As a result, it is possible to increase the laser powers of the individual laser diodes up to a maximum of 100% in order to compensate for degradation effects.

On the other hand, a specific number of laser diodes can be run up to 100% of the nominal power thereof, for example briefly, in order to bring about a specific change in the laser radiation pattern and thus a change in the color locus of the mixed light.

Furthermore, it may be advantageous additionally to reduce the radiation power of at least some of the remaining laser diodes to an extent such that the total $V(\lambda)$-weighted luminous flux of the wavelength-converted radiation, of the resulting mixed light, remains the same.

For some applications, it may be advantageous for the mixed light that is wavelength-converted by means of the phosphors to be mixed with one or a plurality of further colored light portions. By way of example, for generating white mixed light it may be advantageous for the red and green colored light portions that are generated by phosphor conversion to be mixed with a blue colored light portion, for example from a blue light-emitting diode (LED).

BRIEF DESCRIPTION OF THE DRAWINGS

The invention will be explained in greater detail below on the basis of exemplary embodiments. In the figures:

FIG. 4 shows different phosphor patterns.

DETAILED DESCRIPTION OF THE DRAWINGS

Figure 1:
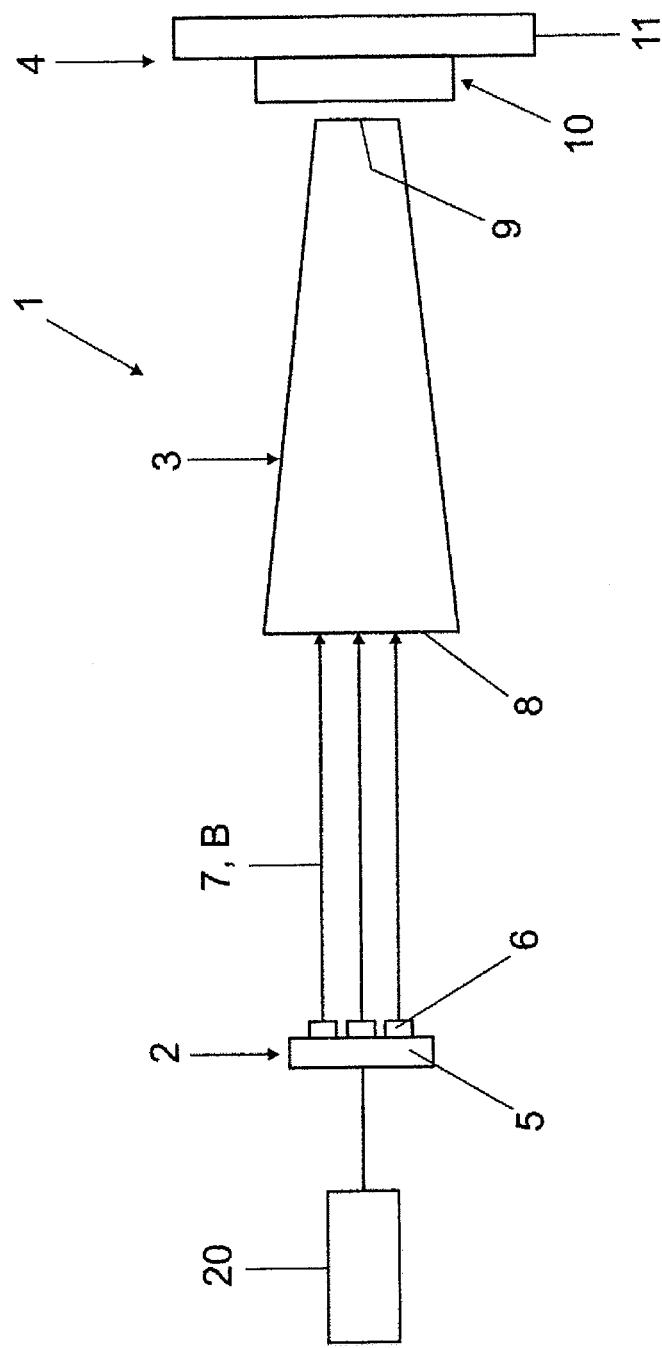
FIG. 1 shows a lighting device according to the invention comprising laser matrix, light mixer and phosphor arrangement.
Figure 2:
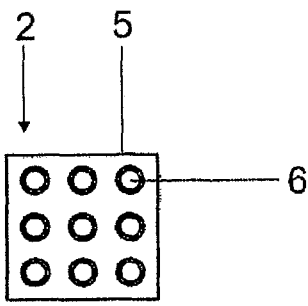
FIG. 2 shows the laser matrix from FIG. 1.
Figure 3A:
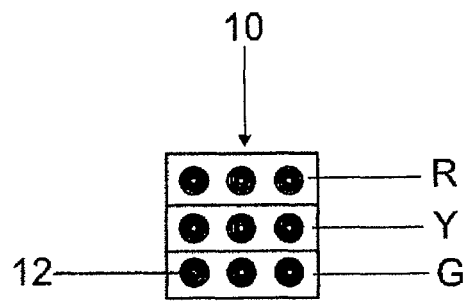
FIG. 3a shows the phosphor layer from FIG. 1.

FIG. 1 schematically illustrates a simplified exemplary embodiment of a lighting device 1 according to the invention. The lighting device 1 comprises a laser matrix 2, an elongate optical light mixer 3 and a phosphor arrangement 4. The laser matrix 2 consists of a carrier 5, on which nine blue laser diodes 6 (emission wavelength approximately 445 nm), which are individually drivable by means of a controller 20, are arranged in a 3 by 3 matrix. FIG. 2 shows the laser matrix 2 in a plan view, such that all nine laser diodes 6 can be discerned. The laser beams 7 (only illustrated symbolically in FIG. 1) enter the elongate light mixer 3 at a first end 8 and emerge again at the other end 9 of said light mixer. The other end 9 of the light mixer 3 is followed by an approximately 40 µm thick phosphor layer 10, which is arranged on a cooling element 11, thus together forming the phosphor arrangement 4. The cooling element 11 consists, for example, of aluminum, copper, silver, graphite, sapphire ($Al_2O_3$), diamond, silicon carbide, magnesium and/or iron. Furthermore, the heat sink can also comprise ceramics such as, for instance, AlN and/or alloys, for example aluminum alloys or brass. The laser beams 7, after passing through the light mixer 3, impinge on the phosphor layer 10 and form there a laser radiation pattern (not discernable in FIG. 1). FIG. 3a schematically shows, in a plan view, the phosphor layer 10 with the laser radiation pattern 12, which substantially consists of nine laser beam spots in a 3 by 3 matrix arrangement. For the sake of simplicity, the nine laser beam spots forming a laser radiation pattern 12 are illustrated as distinctly separated from one another. The phosphor layer 10 consists of three strip-shaped phosphors R, Y, G arranged parallel alongside one another. These are a red phosphor (R), for example calsin:
$CaAlSiN_3$:Eu,
a yellow phosphor (Y), for example:
$(Y_{0.96}Ce_{0.04})_3 Al_{3.75} Ga_{1.25} O_{12}$,
and a green phosphor (G), for example:
YAG:Ce $(Y_{0.96}Ce_{0.04})_3 Al_{3.75} Ga_{1.25} O_{12}$.

The laser radiation is wavelength-converted by the three strip-shaped phosphors R, Y and G and the resulting colored light portions are scattered into the light mixer 3 through the second end 9.

Figure 3B:
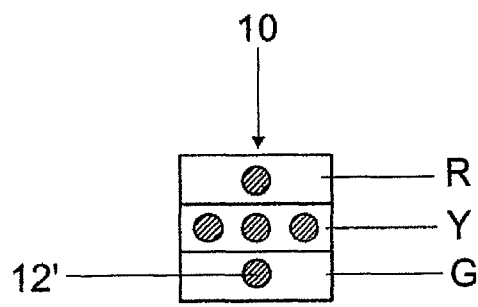
FIG. 3b shows the phosphor layer from FIG. 1 with a changed laser radiation pattern.
Figure 3C:
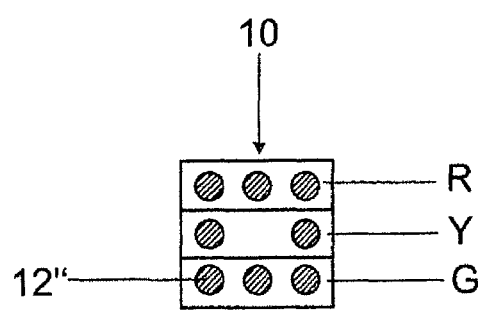
FIG. 3c shows the phosphor layer from FIG. 1 with a changed laser radiation pattern.

FIG. 3b shows an alternative laser radiation pattern 12' on the R-Y-G phosphor pattern. In contrast to FIG. 3a, not all nine lasers are driven here, but rather—in the first and third rows—only the central laser diode in each case. The red phosphor R and the green phosphor G are therefore pumped to a significantly lesser extent in comparison with FIG. 3a. Consequently, their contribution to the mixed light is correspondingly smaller, which results in a corresponding color locus shift. FIG. 3c shows a further variant of a laser radiation pattern 12" on the R-Y-G phosphor pattern. Here, all of the laser diodes apart from the central laser diode are driven by means of the controller 20. As a result, the yellow phosphor Y is pumped to a lesser extent. It goes without saying that many further laser radiation patterns can be realized, depending on the desired color locus shift. By way of example, individual laser diodes can also be operated only with reduced power, in order to release only a small color locus shift.

Depending on the optical design of the light mixer 3 and the laser matrix 2, the laser beam spots can also partly overlap or form a deviating, for example distorted, laser radiation pattern. All that is crucial is that, by controlling the laser diodes 6, it is possible to control, influence in a targeted manner, the shape and/or intensity distribution of the laser radiation pattern 12 and thus the respective contribution of the individual phosphors R, Y, G.

The optical light mixer 3 is embodied as a TIR optical system and substantially consists of a conical glass rod having an octagonal cross section. The colored light portions backscattered from the phosphors R, Y, G are subjected to total internal reflection multiply within the light mixer 3 at the interface with the surroundings and are thus spatially intermixed. The mixed light, consisting of the colored light portions R, Y, G in this exemplary embodiment, leaves the light mixer 3 through the first end 8 for further use (not illustrated in FIG. 1). The color control is effected by the control of the radiation power (including laser diode(s) on/off) of the individual laser diodes 9. The shape and/or the surface power distribution of the laser radiation pattern 12 and, consequently, the conversion proportion from each phosphor R, Y, G with respect to the mixed light are controlled as a result. The mixed light can be coupled out to the side by means of a dichroic mirror (not illustrated) arranged in a tilted fashion between laser matrix 2 and light mixer 3. For this purpose, the side facing the light mixer is coated with an interference layer which reflects the mixed light and transmits the blue laser radiation.

FIGS. 4a to 4j illustrate a selection of alternative phosphor patterns for the segmented phosphor layer 10 of the phosphor arrangement 4 in FIG. 1. Besides phosphor patterns with three different phosphors (FIGS. 4a, 4f, 4h and 4j), depending on the application, phosphor patterns with only two different phosphors are also suitable (FIGS. 4b-4e, 4g and 4i). Moreover, the individual phosphors, instead of being embodied in a strip-shaped fashion (FIGS. 4d, 4e, 4i and 4j), can also be embodied in a circular fashion and be arranged one in another (FIG. 4f) or within rectangular or strip-shaped phosphors (FIGS. 4a-4c, 4g and 4h). Furthermore, further suitable phosphor patterns composed of two, three or else more phosphors are conceivable.

Figure 5:
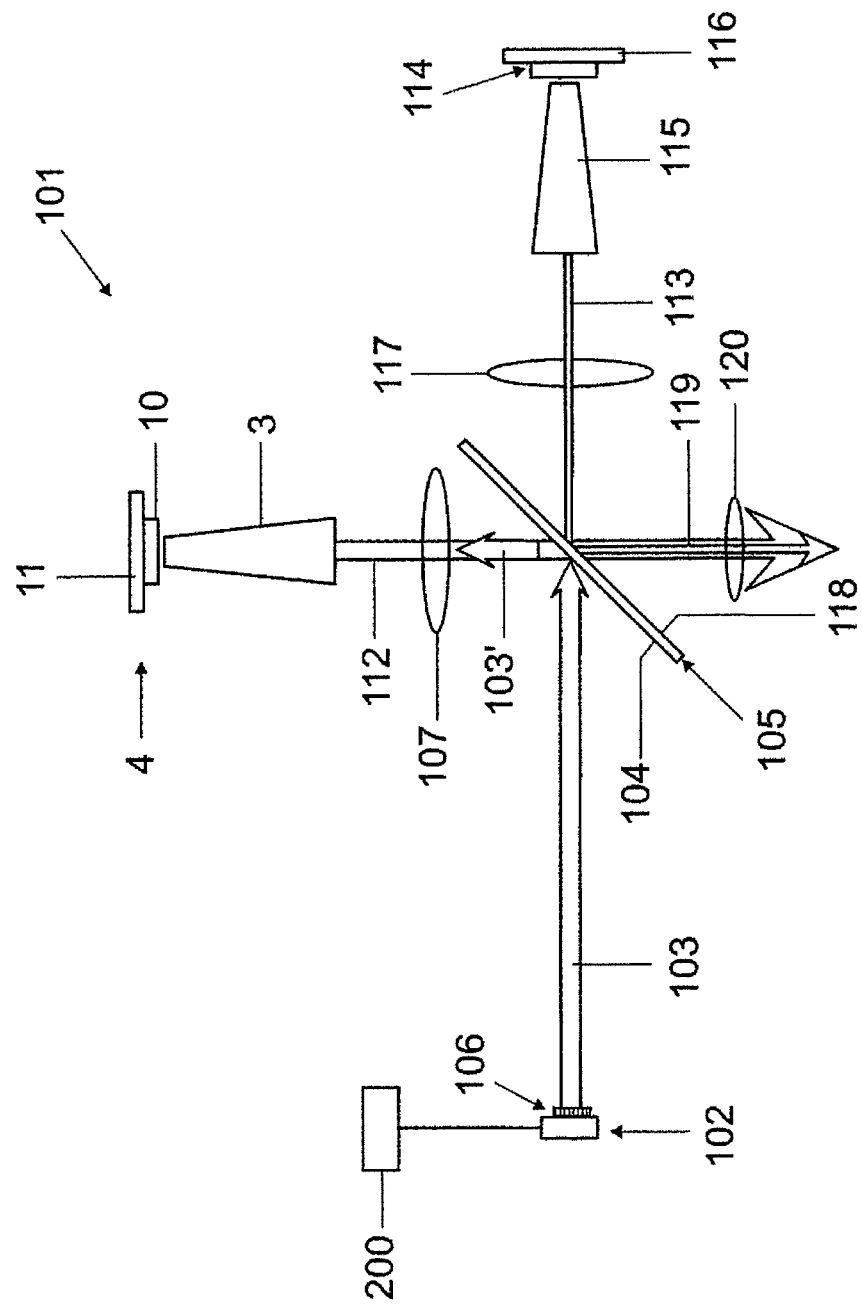
FIG. 5 shows a lighting device according to the invention on the basis of FIG. 1 with admixed blue LED light.

FIG. 5 shows a schematic illustration of a further exemplary embodiment. The latter is based on the arrangement shown in FIG. 1, but—for the generation of white mixed light with color control—is supplemented by an optical branch for admixing a blue colored light portion (B). The lighting device 101 illustrated is suitable for example as a replacement for a xenon discharge lamp in lighting arrangements such as endoscopy, microscopy or medical head lamps, with the additional possibility of color control. A laser diode matrix 102 consisting of six times seven blue laser diodes 106 supplies a total laser beam power of approximately 42 W. The 42 blue laser diodes 106 are individually drivable by means of a controller 200. The total laser beam 103 consisting of 42 individual laser beams (not illustrated) is reflected from the rear side 104 of a dichroic mirror 105. For this purpose, the rear side 104 of the dichroic mirror 105 is provided with an interference coating that reflects blue light and transmits other colored light portions. The dichroic mirror 105 is tilted such that the total laser beam 103 is incident at an angle of 45° with respect to the perpendicular. The angle between the incident total laser beam 103 and the reflected total laser beam 103' is therefore approximately 90°. The reflected total laser beam 103' passes through a lens 107, which focuses the 42 individual laser beams onto the entrance surface of a first TIR optical system 3, said entrance surface having a surface area of 4 mm². The first TIR optical system 3 guides the individual laser beams by total internal reflection onto the phosphor layer 10, where they generate a laser radiation pattern (not discernible in FIG. 5; see FIG. 2). As already described in connection with FIG. 1, the elongate TIR optical system 3 is shaped conically, its narrower end facing the phosphor layer 10. The segmented phosphor layer 10, which consists of the three phosphor components R, Y, G forming a strip pattern (not discernible in FIG. 5; see FIG. 3), converts the incident blue laser light almost completely (more than 95%) into the colored light portions red, yellow and green respectively corresponding to the irradiated phosphor components R, Y, G. For further details of the phosphor arrangement 4, reference is made to the description of FIG. 1. The colored light portions coming from the segmented phosphor layer 10 are collected and mixed by the TIR optical system 3. Downstream of the TIR optical system 3, the colored mixed light 112 is parallelized by the lens 107. As a result, unacceptable deviations of the incident mixed light beams from the envisaged angle of incidence of the dichroic mirror 105 are avoided and a maximum transmission of the colored mixed light 112 through the interference coating is thus ensured. The small remainder of the blue laser radiation 103' that is backscattered without wavelength conversion is blocked by the rear side 104 of the dichroic mirror 105, thereby avoiding laser-typical risks to the human eye upon further use of the useful light. Moreover, blue light 113 from one or a plurality of blue LEDs 114 (e.g. LE B Q6WP from OSRAM Opto Semiconductor) mounted on a heat sink 116 is admixed with the R-Y-G-colored mixed light 112. For this purpose, the blue LED light 113 is directed onto the front side 118 of the dichroic mirror 105 via a second TIR optical system 115, which incidentally is identical to the first TIR optical system 3, and via a parallelizing lens 117 colinearly with respect to the blue total laser beam 103. The front side 118 is provided with an interference coating that reflects the blue LED light 113 and transmits the R-Y-G-colored mixed light 112. Given suitable alignment of all the optical components, an R-Y-G-B mixed light 119 results. Given suitable control of the individual laser diodes 106, white R-Y-G-B mixed light, in particular, can be generated. The color locus of the mixed light can be shifted along the Planckian locus of the CIE chromicity diagram, for example, by means of the color control already mentioned, or else allows virtually arbitrary color coordinates of the sRGB color space to be realized. A third lens 120 is provided for focusing the mixed light onto the input aperture of an optical waveguide (not illustrated). With the lighting device 101, for white useful light a luminous flux of approximately 2600 lm is obtained, the color locus of which is controllable over a wide range.

Furthermore, sensors can be provided (not illustrated) which measure colored light portions scattered at the TIR optical systems. The sensor signals can be used for controlling or regulating the power of the individual laser diodes 106 and of the LED 114, for example in order that a preselected color locus of the useful light is kept constant.

Alternatively, the phosphor segments that are thermally insulated from one another by separating grooves can be provided with assigned thermal sensors on their respective rear side for the color control.

Figure 6:
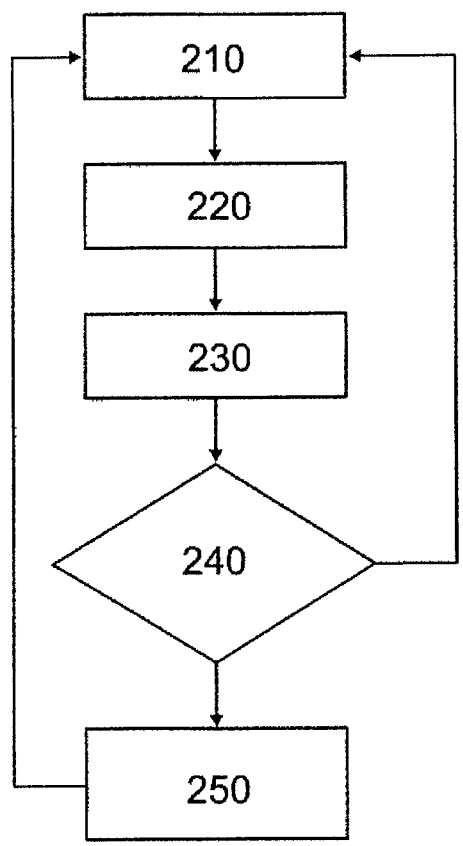
FIG. 6 shows, in a schematic illustration, a flow chart of one exemplary embodiment of a method according to the invention.

FIG. 6 shows, in a schematic illustration, one exemplary embodiment of a method according to the invention for operating the lighting device 1 shown in FIG. 1. The method begins in step 210 by driving the laser diodes 6 of the laser matrix 2. The individual laser beams emitted by the 3 by 3 laser diodes 6 are radiated onto the segmented phosphor layer 10 of the phosphor arrangement 4 (step 220), where they generate a laser radiation pattern. The phosphors R, Y, G of the phosphor layer 10 that form a strip-shaped phosphor pattern convert the laser radiation into corresponding colored light portions, weighted according to the laser radiation pattern portion incident on the respective phosphor. In step 230, the colored light portions are collected and intermixed by means of the TIR light mixer 3. A YES/NO branch ensues in step 240. If a change in the color locus of the R-Y-G mixed light is not required, the method branches back to the start (step 210), that is to say that the driving of the laser diodes 6 of the laser matrix 2 is not changed. However, if a change in the color locus is desired, a corresponding change of the driving of at least one laser diode of the laser matrix 2 is performed in step 250. In other words, the reaction to a request for a change in the color locus is that the drive pattern of the laser diode matrix is changed. With this changed drive pattern, the method branches back to the start (step 210). The changed drive pattern brings about the irradiation of the phosphor pattern with a changed laser radiation pattern in step 220. As a result, in step 230, there is a change in the weighting of the colored light portions in the R-Y-G mixed light and thus the color locus thereof.

A further development of the above exemplary embodiment of a method according to the invention (not illustrated) is suitable for operating the lighting device 101 shown in FIG. 5. Here a further method step involves mixing the blue light (B) emitted by the LED 114 with the R-Y-G mixed light to form R-Y-G-B mixed light. The color locus of the R-Y-G-B mixed light is controlled by means of the targeted control of the laser matrix 2, as explained above. It can be supplemented as necessary with the control of the LED 114.

A lighting device comprising a pump laser matrix and a phosphor arrangement for generating mixed light with color control is proposed. For this purpose, by means of the targeted driving of the individual lasers of the laser matrix, in other words by means of a corresponding drive pattern of the laser matrix, a pump radiation pattern Is generated on the phosphor arrangement. The phosphor arrangement comprises at least two different phosphors that form a phosphor pattern. The color control is effected by means of the targeted control of the pump radiation pattern on the phosphor pattern. The proportional contribution to the mixed light by the colored light components generated by wavelength conversion of the pump radiation by the individual phosphors and thus also the color locus of the mixed light are controlled as a result.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A lighting device comprising:
   a first pump laser matrix configured to emit blue laser light or ultraviolet laser radiation along a first path, the first pump laser matrix having a controllable pump radiation power distribution, the first pump laser matrix being comprised of a plurality of individual pump lasers or groups of pump lasers;
   a single dichroic mirror positioned to receive the blue laser light or ultraviolet laser radiation emitted by the first pump laser matrix on a rear side surface, the dichroic mirror being oriented at a 45° angle relative to the first path, the rear side surface having an interference coating that reflects the blue laser light or ultraviolet laser radiation emitted by the first pump laser matrix and transmits other colors of light and other radiation, the dichroic mirror having a front side surface having an interference coating that reflects blue laser light or ultraviolet laser radiation and transmits other colors of light and other radiation, the front side surface being opposite the rear side surface;
   a static phosphor arrangement comprising at least two different phosphors, the static phosphor arrangement being positioned to receive the blue laser light or ultraviolet laser radiation reflected by the rear side surface of the dichroic mirror, the at least two different phosphors of the static phosphor arrangement being capable of being irradiated simultaneously with the blue laser light or ultraviolet laser radiation reflected by the rear side surface of the dichroic mirror to be re-emitted at least partly, and in each case differently, wavelength-converted toward the rear side surface of the dichroic mirror;
   a second pump laser matrix configured to emit blue laser light or ultraviolet laser radiation along a second path toward the front side surface of the dichroic mirror, the second pump laser matrix having a controllable pump radiation power distribution, the dichroic mirror being oriented at a 45° angle relative to the second path; and
   a control device which provides for the first pump laser matrix a drive pattern for separately driving surface power density of the pump radiation of the individual pump lasers or groups of pump lasers of the first pump laser matrix,
   wherein the static phosphor arrangement comprises two different phosphors arranged in separate concentric areas.

2. The lighting device of claim 1, further comprising:
   a first optical light mixer positioned between the rear side surface of the dichroic mirror and the static phosphor arrangement so as to receive the blue laser light or ultraviolet laser radiation reflected by the rear side surface of the dichroic mirror and so as to receive the light or radiation re-emitted by the static phosphor arrangement, the first optical light mixer mixing the light or radiation re-emitted by the static phosphor arrangement; and
   a second optical light mixer positioned between the front side surface of the dichroic mirror and the second pump laser matrix so as to receive light or radiation transmitted through the dichroic mirror and so as to receive the light or radiation emitted by the second pump laser matrix.

3. The lighting device of claim 1, wherein the phosphors of the phosphor arrangement are arranged as separate segments.

4. The lighting device of claim 1, wherein the pump lasers are embodied as laser diodes.

5. The lighting device of claim 1, wherein at least one of the first pump laser matrix and the second pump laser matrix comprises at least one laser and a spatial light modulator positioned to be irradiated thereby.

6. The lighting device of claim 1, wherein the control device is configured to control distribution of the surface power density of the pump radiation such that each of the at least two different phosphors is simultaneously irradiated with a different power density.

7. A lighting device comprising:
   a first pump laser matrix configured to emit blue laser light or ultraviolet laser radiation along a first path, the first pump laser matrix having a controllable pump radiation power distribution, the first pump laser matrix being comprised of a plurality of individual pump lasers or groups of pump lasers;
   a single dichroic mirror positioned to receive the blue laser light or ultraviolet laser radiation emitted by the first pump laser matrix on a rear side surface, the dichroic mirror being oriented at a 45° angle relative to the first path, the rear side surface having an interference coating that reflects the blue laser light or ultraviolet laser radiation emitted by the first pump laser matrix and transmits other colors of light and other radiation, the dichroic mirror having a front side surface having an interference coating that reflects blue laser light or ultraviolet laser radiation and transmits other colors of light and other radiation, the front side surface being opposite the rear side surface;
   a static phosphor arrangement comprising at least two different phosphors, the static phosphor arrangement being positioned to receive the blue laser light or ultraviolet laser radiation reflected by the rear side surface of the dichroic mirror, the at least two different phosphors of the static phosphor arrangement being capable of being irradiated simultaneously with the blue laser light or ultraviolet laser radiation reflected by the rear side surface of the dichroic mirror to be re-emitted at least partly, and in each case differently, wavelength-converted toward the rear side surface of the dichroic mirror;

a second pump laser matrix configured to emit blue laser light or ultraviolet laser radiation along a second path toward the front side surface of the dichroic mirror, the second pump laser matrix having a controllable pump radiation power distribution, the dichroic mirror being oriented at a 45° angle relative to the second path; and a control device which provides for the first pump laser matrix a drive pattern for separately driving surface power density of the pump radiation of the individual pump lasers or groups of pump lasers of the first pump laser matrix, wherein the static phosphor arrangement comprises three different phosphors arranged in separate concentric areas.

8. The lighting device of claim 7, further comprising:

a first optical light mixer positioned between the rear side surface of the dichroic mirror and the static phosphor arrangement so as to receive the blue laser light or ultraviolet laser radiation reflected by the rear side surface of the dichroic mirror and so as to receive the light or radiation re-emitted by the static phosphor arrangement, the first optical light mixer mixing the light or radiation re-emitted by the static phosphor arrangement; and a second optical light mixer positioned between the front side surface of the dichroic mirror and the second pump laser matrix so as to receive light or radiation transmitted through the dichroic mirror and so as to receive the light or radiation emitted by the second pump laser matrix.

9. The lighting device of claim 7, wherein the phosphors of the phosphor arrangement are arranged as separate segments.

10. The lighting device of claim 7, wherein the pump lasers are embodied as laser diodes.

11. The lighting device of claim 7, wherein at least one of the first pump laser matrix and the second pump laser matrix comprises at least one laser and a spatial light modulator positioned to be irradiated thereby.

12. The lighting device of claim 7, wherein the control device is configured to control distribution of the surface power density of the pump radiation such that each of the at least two different phosphors is simultaneously irradiated with a different power density.

13. A lighting device comprising:

a first pump laser matrix configured to emit blue laser light or ultraviolet laser radiation along a first path, the first pump laser matrix having a controllable pump radiation power distribution, the first pump laser matrix being comprised of a plurality of individual pump lasers or groups of pump lasers;

a single dichroic mirror positioned to receive the blue laser light or ultraviolet laser radiation emitted by the first pump laser matrix on a rear side surface, the dichroic mirror being oriented at a 45° angle relative to the first path, the rear side surface having an interference coating that reflects the blue laser light or ultraviolet laser radiation emitted by the first pump laser matrix and transmits other colors of light and other radiation, the dichroic mirror having a front side surface having an interference coating that reflects blue laser light or ultraviolet laser radiation and transmits other colors of light and other radiation, the front side surface being opposite the rear side surface;

a static phosphor arrangement comprising at least two different phosphors, the static phosphor arrangement being positioned to receive the blue laser light or ultraviolet laser radiation reflected by the rear side surface of the dichroic mirror, the at least two different phosphors of the static phosphor arrangement being capable of being irradiated simultaneously with the blue laser light or ultraviolet laser radiation reflected by the rear side surface of the dichroic mirror to be re-emitted at least partly, and in each case differently, wavelength-converted toward the rear side surface of the dichroic mirror;

a second pump laser matrix configured to emit blue laser light or ultraviolet laser radiation along a second path toward the front side surface of the dichroic mirror, the second pump laser matrix having a controllable pump radiation power distribution, the dichroic mirror being oriented at a 45° angle relative to the second path; and a control device which provides for the first pump laser matrix a drive pattern for separately driving surface power density of the pump radiation of the individual pump lasers or groups of pump lasers of the first pump laser matrix, wherein the static phosphor arrangement comprises three different phosphors with two different phosphors arranged in separate strips and a third different phosphor arranged in a separate circular area between the separate strips.

14. The lighting device of claim 13, further comprising:

a first optical light mixer positioned between the rear side surface of the dichroic mirror and the static phosphor arrangement so as to receive the blue laser light or ultraviolet laser radiation reflected by the rear side surface of the dichroic mirror and so as to receive the light or radiation re-emitted by the static phosphor arrangement, the first optical light mixer mixing the light or radiation re-emitted by the static phosphor arrangement; and a second optical light mixer positioned between the front side surface of the dichroic mirror and the second pump laser matrix so as to receive light or radiation transmitted through the dichroic mirror and so as to receive the light or radiation emitted by the second pump laser matrix.

15. The lighting device of claim 13, wherein the phosphors of the phosphor arrangement are arranged as separate segments.

16. The lighting device of claim 13, wherein the pump lasers are embodied as laser diodes.

17. The lighting device of claim 13, wherein at least one of the first pump laser matrix and the second pump laser matrix comprises at least one laser and a spatial light modulator positioned to be irradiated thereby.

18. The lighting device of claim 13, wherein the control device is configured to control distribution of the surface power density of the pump radiation such that each of the at least two different phosphors is simultaneously irradiated with a different power density.

* * * * *